United States Patent
Suck et al.

(10) Patent No.: US 7,285,577 B2
(45) Date of Patent: Oct. 23, 2007

(54) METHOD FOR PRODUCING RIGID POLYURETHANE FOAM

(75) Inventors: Sang-jo Suck, Kwangju (KR); Bong-ku Kim, Kwangju (KR); Jang-su An, Kwangju (KR); Hyo-seob Kim, Kwangju (KR); Dae-sung Yang, Kwangju (KR); Seong-ho Ahn, Kwangju (KR); Hong-gi Kim, Jeollanam-do (KR); Suk-jo Lee, Kwangju (KR); Jeong-hon Kim, Kwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/959,112

(22) Filed: Oct. 7, 2004

(65) Prior Publication Data

US 2005/0154072 A1  Jul. 14, 2005

(30) Foreign Application Priority Data

Jan. 8, 2004   (KR) ................. 10-2004-0001036
May 14, 2004  (KR) ................. 10-2004-0034455

(51) Int. Cl.
    *C08J 9/14*   (2006.01)
(52) U.S. Cl. ............. 521/131; 521/130; 521/170; 521/174
(58) Field of Classification Search ........ 521/130, 521/131, 170, 174
    See application file for complete search history.

(56) References Cited

U.S. PATENT DOCUMENTS

| | | | |
|---|---|---|---|
| 5,034,424 A | 7/1991 | Wenning et al. | |
| 5,250,579 A * | 10/1993 | Smits et al. | 521/98 |
| 5,290,823 A | 3/1994 | Volkert | |
| 5,318,996 A * | 6/1994 | Yu-Hallada et al. | 521/131 |
| 5,428,104 A | 6/1995 | Barker et al. | |
| 5,668,187 A | 9/1997 | Asako et al. | |
| 5,698,606 A | 12/1997 | De Vos et al. | |
| 5,840,781 A * | 11/1998 | Dietrich et al. | 521/167 |
| 6,617,368 B2 * | 9/2003 | Steppan et al. | 521/159 |
| 2003/0078312 A1 | 4/2003 | Hibino et al. | |

FOREIGN PATENT DOCUMENTS

| | | |
|---|---|---|
| CN | 1086226 A | 5/1994 |
| EP | 0 934 971 | 8/1999 |
| EP | 1 219 653 A1 | 3/2002 |
| JP | 8-193115 | 7/1996 |
| JP | 9-165427 | 6/1997 |
| KR | 2001-42886 | 5/2001 |
| KR | 2001-78565 | 8/2001 |
| KR | 2001-100984 | 11/2001 |
| KR | 10-356486 | 9/2002 |
| KR | 2003-15077 | 2/2003 |
| KR | 2003-26771 | 4/2003 |
| KR | 2003-59697 | 7/2003 |

OTHER PUBLICATIONS

H. Yoshimura et al., "An Insight into the Characteristics of Nucleation Catalyst in CFC-Free Rigid Foam Systems", 35th Annual Polyurethane Technical Marketing Conference, Oct. 1994, pp. 300-310.
European Office Action and Search Report dated Apr. 19, 2005 for the corresponding application.
Chinese Patent Office Action for corresponding Chinese Patent Application No. 2004101000109 dated Feb. 10, 2006.
Korean Patent Office Action for corresponding Korean Patent Application No. 10-2004-0034455 dated Oct. 4, 2005.

* cited by examiner

*Primary Examiner*—John M. Cooney, Jr.
(74) *Attorney, Agent, or Firm*—Staas & Halsey LLP

(57) ABSTRACT

A method to produce a rigid polyurethane foam includes emulsifying a nucleating agent by mixing the nucleating agent with a polyol and a foam stabilizer, preparing a polyol mixture by mixing water, a catalyst, and a blowing agent at one of: before the emulsifying, during the emulsifying and after the emulsifying, and reacting the polyol mixture with a polyisocyanate.

7 Claims, 2 Drawing Sheets

METHOD FOR PRODUCING RIGID POLYURETHANE FOAM

CROSS-REFERENCE TO RELATED APPLICATIONS

This application claims the benefit of Korean Patent Application No. 2004-001036, filed Jan. 08, 2004, in the Korean Intellectual Property Office and Korean Patent Application No. 2004-0034455, filed May 14, 2004 in the Korean Intellectual Property Office, the disclosures of which are incorporated herein by reference.

BACKGROUND OF THE INVENTION

1. Field of the Invention

The present invention relates to methods for the preparation of a rigid polyurethane foam, and more particularly, to methods for the preparation of a rigid polyurethane foam having improved heat insulating properties by using an emulsified nucleating agent.

2. Description of the Related Art

To obtain rigid polyurethane foam, CFCs (chlorofluorocarbons) such as trichlorofluoromethane or dichlorofluoromethane, are conventionally used as a blowing agent. However, CFCs are regarded as environment-destroying materials, because they destroy the ozone layer or cause the green house effect. Thus, the production and use of CFCs have recently been prohibited, and are being replaced by other substituents.

As substituents for CFCs, HCFCs (hydrochlorofluorocarbons) have been used as a blowing agent. HCFCs are less destructive of the ozone layer than CFCs. The closed cell size of the rigid polyurethane foam formed using HCFCs is 200-300 μm, which is greater than a closed cell size of the rigid polyurethane foam formed using CFCs. But the rigid polyurethane foam using HCFCs has excellent heat insulating properties (adiabatic index: 0.0144 mW/mk) due to the low gas adiabatic index of the HCFCs (adiabatic index: 0.0094 mW/mk). However, since HCFCs also may destroy the ozone layer to a certain degree, their use is being gradually reduced.

Meanwhile, a hydrocarbon blowing agent such as cyclopentane, which does not destroy the ozone layer, was recently proposed.

However, since the rigid polyurethane foam formed using cyclopentane has a large closed cell size of 200-300 μm, and the adiabatic index of cyclopentane is 0.012 mW/mk, which is higher than the adiabatic index of CFCs and HCFCs, the heat insulating properties of the rigid polyurethane foam are ineffective (adiabatic index: 0.0165 mW/mk). Accordingly, a larger volume is needed for rigid polyurethane foam formed using cyclopentane to obtain the same adiabatic effect as the adiabatic effect obtained by forming the rigid polyurethane foam formed using CFCs and HCFCs.

To solve the above and/or other problems, a nucleating agent, such as a perfluorinated alkene, has been used in the reaction. However, the resultant rigid polyurethane foam obtained shows poor heat insulating properties since the nucleating agent makes the reaction system unstable.

SUMMARY OF THE INVENTION

Accordingly, it is an aspect of the present invention to provide a method to produce a rigid polyurethane foam having excellent heat insulating properties.

Additional aspects and/or advantages of the invention will be set forth in part in the description which follows and, in part, will be obvious from the description, or may be learned by practice of the invention.

The foregoing and/or other aspects of the present invention are achieved by providing a method to produce a rigid polyurethane foam that comprises: emulsifying a nucleating agent by mixing the nucleating agent with a polyol and a foam stabilizer, preparing a polyol mixture by mixing water, a catalyst, and a blowing agent with the polyol mixture before the emulsifying, during the emulsifying or after the emulsifying, and reacting the polyol mixture with a polyisocyanate.

According to an aspect of the present invention, the preparing the polyol mixture further comprises mixing at least one of an additional polyol and an additional foam stabilizer before the emulsifying, during emulsifying, or after emulsifying.

According to an aspect of the present invention, the nucleating agent compromises a perfluorinated alkene containing at least 6 carbons.

According to an aspect of the present invention, the nucleating agent has a boiling point of 20-80° C.

According to an aspect of the present invention, the amount of the nucleating agent is 0.5-5 parts by weight per 100 parts by weight of a total polyol, which comprises the polyol and the additional polyol.

According to an aspect of the present invention, a total polyol, which comprises the polyol and the additional polyol, comprises a polyaromatic polyol by 15-70 parts by weight.

According to an aspect of the present invention, the polyaromatic polyol comprises a toluenediamine-based polyol.

According to an aspect of the present invention, the blowing agent is a hydrocarbon.

According to an aspect of the present invention, the hydrocarbon is a cyclopentane.

According to an aspect of the present invention, the agitation in emulsifying the nucleating agent is performed by a homomixer at approximately 1000-6000 rpm.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
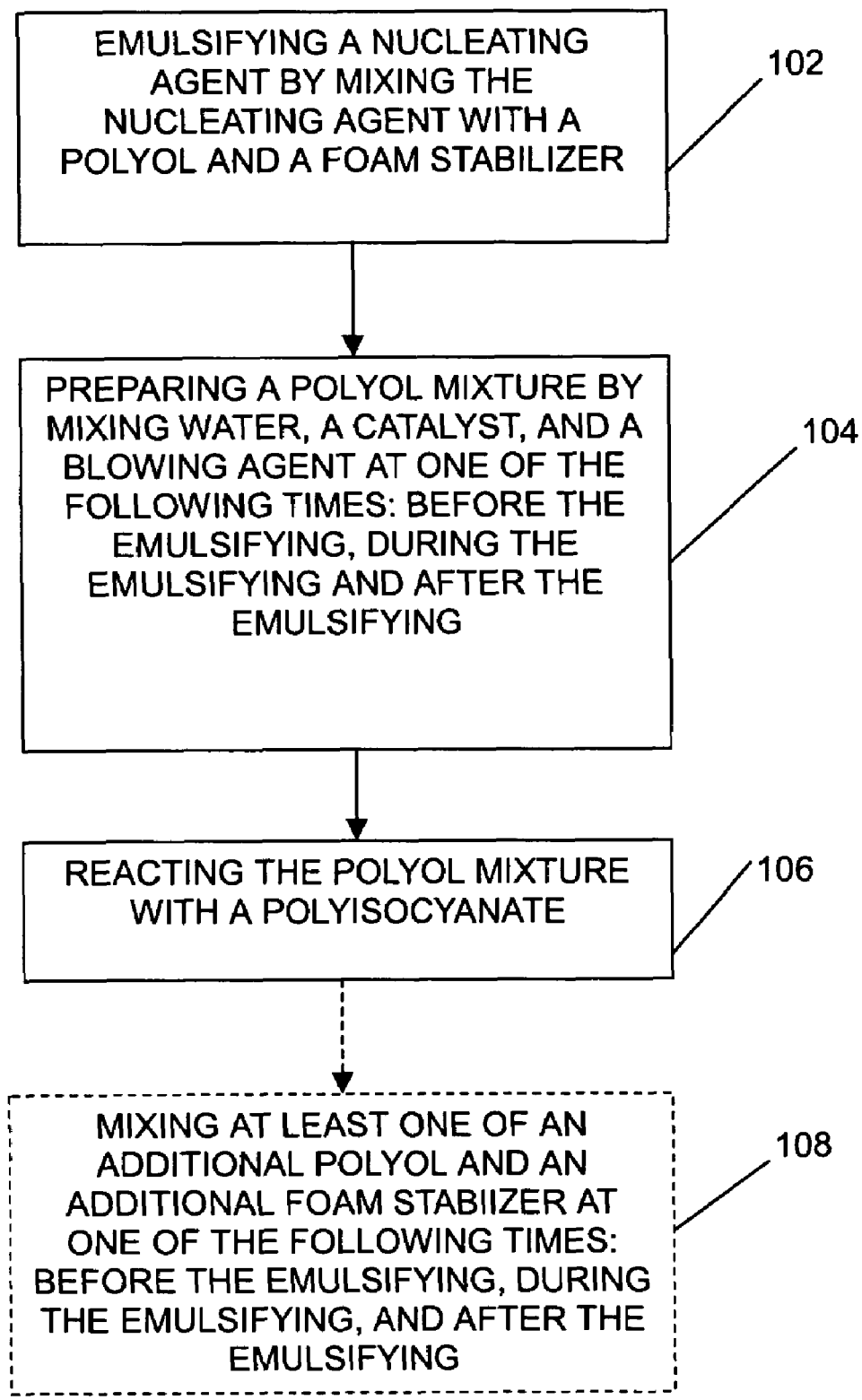
FIG. 1 is a flow chart showing operations in accordance with an embodiment of the method of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will be described in more detail hereinafter.

A method to prepare a rigid polyurethane foam according to an embodiment of the present invention uses an emulsified nucleating agent, which is included in a polyol mixture and reacts with a polyisocyanate.

Generally, the heat insulating property is represented by the following equation (1):

$$\lambda_{total}=\lambda_{gas}+\lambda_{solid}+\lambda_{radiation}$$

In equation (1), $\lambda_{gas}$ is the adiabatic index of the blowing agent existing in the closed cell of the rigid polyurethane foam, and represents 74% of the total adiabatic index ($\lambda_{total}$). Further, the heat insulating property of the rigid polyurethane foam is affected by the composition of a blowing agent. Thus, with increasing amounts of the blowing agent resulting in a rigid polyurethane foam having a low adiabatic index, a more improved heat insulating property is obtainable. $\lambda_{solid}$ is the adiabatic index of the urethane resin comprising the rigid polyurethane foam and represents 10% of $\lambda_{total}$. The adiabatic index may be affected by the density of the rigid polyurethane foam. But most of the rigid polyurethane foam is hardly affected by the density. Generally, the rigid polyurethane foam shows the most effective heat insulating property when the density is 30-40 kg/m$^3$. $\lambda_{radiation}$ is the adiabatic index when the radiation is between the closed cells of the rigid polyurethane foam and represents 16% of $\lambda_{total}$. Further, the heat insulating property is affected by the closed cell size of the rigid polyurethane foam and is proportional to the closed cell size.

Accordingly, if a cyclopentane having a high adiabatic index is used as the blowing agent, the $\lambda_{radiation}$ of Equation (1) should be lowered to improve the heat insulating properties. $\lambda_{radiation}$ may be lowered by decreasing the size of the closed cell.

To improve the adiabatic index of the rigid polyurethane foam by deceasing the size of the closed cell, the present invention adopts a nucleating agent which is in a liquid phase. By adding the nucleating agent to the reaction, numerous nuclei of microbubbles are generated at the initial step of the reaction. The nuclei of the microbubbles maintain their state even at the terminal step of reaction; thus the size of the closed cell is small.

However, in a conventional reaction system to prepare a rigid polyurethane foam, adding the nucleating agent may cause the reaction system to become unstable because a high density of the nucleating agent easily induces phase separation. Thus, maintaining a small size of the closed cell is difficult.

To solve the above problems, in one embodiment, the present invention uses the nucleating agent in an emulsified state. In a reaction system to prepare the rigid polyurethane foam with an emulsified nucleating agent, the nuclei of the microbubbles are generally generated at the initial step of reaction, when all components are mixed. After the mixing, the reactant swells due to the chemical reaction and expansion of the blowing agent, and then the urethane reaction follows. Foaming is terminated with a closed cell size of less than 150 μm, and the reactant solidifies.

Particularly, by adding an emulsified nucleating agent, numerous nuclei of microbubbles may be generated at the initial step of the reaction due to the incompatibility between the polar polyol and the non-polar nucleating agent. The reactant maintains an emulsified state due to the incompatibility of the nucleating agent, which prevents the closed cell from growing by reducing the surface tension of the closed cell. Thus, a majority of the nuclei of the microbubbles remain through the reaction, and the size of the closed cell of the solidified rigid polyurethane foam is minimized.

The present invention will be described in more detail by an embodiment of the method of emulsifying the nucleating agent in accordance with the present invention.

Generally, the rigid polyurethane foam is prepared by reaction of the polyisocyanate and the polyol mixture, which comprises water, a foam stabilizer, a blowing agent, a catalyst, a polyol, and a nucleating agent.

An emulsified nucleating agent may be obtained by mixing the nucleating agent, the foam stabilizer and the polyol. In obtaining the emulsified nucleating agent, the water, the catalyst and the blowing agent may be added by all or a part of the total amount that is used in the overall reaction. In obtaining the emulsified nucleating agent, the amount of the foam stabilizer and the polyol, particularly the amount of the polyol, may be a part of a total amount that is used in the overall reaction. That is, for example, after emulsifying the nucleating agent with the foam stabilizer and the polyol, where the amount of the polyol is 30% of the total polyol, the polyol mixture may be obtained by mixing with an additional polyol, an additional foam stabilizer, the water, the catalyst, and the blowing agent. Emulsifying the nucleating agent with a part of the total polyol is more effective than emulsifying the nucleating agent with the total polyol. In one aspect of the present invention, the nucleating agent may be emulsified with 10-30 parts by weight of the total polyol.

Besides, various methods are possible to obtain the polyol mixture with an emulsified nucleating agent. For example, the polyol mixture with the emulsified nucleating agent is obtainable by emulsifying the nucleus agent with the foam stabilizer and the polyol, subsequently adding (and mixing) the water and the catalyst, then adding (and mixing) the blowing agent. Still, the polyol mixture with the emulsified nucleating agent may be obtained by agitating the polyol mixture itself.

That is, in preparing the polyol mixture with the emulsified nucleating agent, mixing the polyol, the foam stabilizer and the nucleating agent being essential, there are various combinations of the water, the catalyst, the blowing agent, the additional polyol, and the additional foam stabilizer that may be utilized.

In an aspect of the present invention, the nucleating agent may comprise a perfluorinated alkene containing at least 6 carbons and having a boiling point of 20-80° C. If the boiling point of the nucleating agent is below 20° C., the nucleating agent may vaporize before the reaction takes place. In contrast, if the boiling point of the nucleating agent is above 80° C., the nucleating agent may not vaporize even at the end of the reaction. In an aspect of the present invention, the amount of the nucleating agent may be 0.5-5 parts by weight per 100 parts by weight of the total polyol having the polyol and the additional polyol. If the amount of the nucleating agent is below 0.5 parts by weight, the resulting rigid polyurethane foam has few improved heat insulating properties. In contrast, if the amount of the nucleating agent is above 5 parts by weight, the resulting rigid polyurethane foam has few further improved heat insulating properties, and thus is uneconomical.

The total polyol may comprise a polyaromatic polyol. The polyaromatic polyol may include, but is not limited to, a toluenediamine-based polyol, a methylenediphenyldiamine-based polyol, and a bisphenol-A-based polyol. The polyaromatic polyol may comprise the toluenediamine-based polyol only. The polyol other than the polyaromatic polyol may be a polyether polyol. The polyaromatic polyol stabilizes the emulsified nucleating agent, thus improving the properties of the rigid polyurethane foam.

In an aspect of the present invention, the amount of the polyaromatic polyol may be 15-70 parts by weight per 100 parts by weight of the total polyol. If the amount of the polyaromatic polyol is below 15 parts by weight, the resulting rigid polyurethane foam has few improved heat insulating properties. In contrast, if the amount of the polyaromatic polyol is above 70 parts by weight, the resulting rigid polyurethane foam becomes brittle.

In an aspect of the present invention, the total polyol may comprise 15-70 parts by weight of the toluenediamine-based polyol having an OH value of 350-550, 10-30 parts by weight of a sucrose glycerine-based polyol having an OH value of 360-490, 5-15 parts by weight of a trimethylolpropane-based polyol having an OH value of 350-450, and 5-15 parts by weight of a glycerine-based polyol having an OH value of 168-670.

As the blowing agent, a hydrocarbon is usable according to the restriction on CFCs and HCFCs. In an aspect of the present invention, the hydrocarbon may be a cyclopentane. The resulting rigid polyurethane foam includes the blowing agent having a poor gas adiabatic index, but has effective heat insulating properties due to a reduced size of closed cells.

The emulsifying of nucleating agent is facilitated with a homomixer of approximately 1000-6000 rpm than with a static mixer. In a case of not emulsifying the total polyol mixture, that is, when the nucleating agent is emulsified with a part of a total polyol mixture, the total polyol mixture is mixed separately.

The present invention will be described in more detail by way of various Examples, which should not be considered as limiting the scope of the invention.

To obtain the results of the following Table 1, test specimens of the rigid polyurethane foam were produced with a vertical mold (1100 mm×300 mm×50 mm) and a high pressure foam generator. The amount of all components used was on the basis of 100 parts by weight of the total polyol. The temperature of all components before foaming was adjusted to 20° C.

TABLE 1

|  |  | Examples | | Comparative Examples | | | | |
|---|---|---|---|---|---|---|---|---|
|  |  | 1 | 2 | 1 | 2 | 3 | 4 | 5 |
| Polyol | Polyol[1] | 60 | 60 | 60 | 10 | 10 | 10 | 10 |
|  | Polyol[2] | 20 | 20 | 20 | 35 | 35 | 35 | 35 |
|  | Polyol[3] | 10 | 10 | 10 | — | — | — | — |
|  | Polyol[4] | 10 | 10 | 10 | 20 | 20 | 20 | 20 |
|  | Polyol[5] | — | — | — | 35 | 35 | 35 | 35 |
| Catalyst | | 2.3 | 2.3 | 2.3 | 2.6 | 2.6 | 2.6 | 2.6 |
| Foam stabilizer | | 2.5 | 2.5 | 2.5 | 2.5 | 2.5 | 2.5 | 2.5 |
| Water | | 1.75 | 1.75 | 1.75 | 1.75 | 1.75 | 1.75 | 1.75 |
| Nucleating Agent[6] | | 2.5 | 2.5 | 2.5 | 2.5 | 2.5 | 0.3 | 0.3 |
| Blowing agent[7] | | 16.5 | 16.5 | 16.5 | 16.5 | 16.5 | 16.5 | 16.5 |
| Mix ratio[8] (polyol/polyisocyanate) | | 100/112 | 100/112 | 100/112 | 100/114 | 100/114 | 100/114 | 100/114 |
| Cell size(μm) | | 100–150 | 100–150 | 200–250 | 150–200 | 150–200 | 200–250 | 200–250 |
| K-factor[9] | | 0.0143 | 0.0144 | 0.0155 | 0.0146 | 0.0147 | 0.0154 | 0.0155 |
| Stable time[10] (days) | | 7 | 6 | 0.25 | 2 | 1 | 3 | 2 |
| Emulsifying method[11] | | Homo-mixer | Static-mixer | — | Homo-mixer | Static-mixer | Homo-mixer | Static-mixer |

[1]toluenediamine-based polyol (OH value: 350–550)
[2]sucrose glycerine-based polyol (OH value: 360–490)
[3]trimethylolpropane-based polyol (OH value: 350–450)
[4]glycerine-based polyol (OH value: 168–670)
[5]sorbitol-based polyol (OH value: 400–500)
[6]nucleating agent (Perfluorinated Alkene (PFA)): from 3M
[7]cyclopentane
[8]mix ratio (all components were mixed with polyol except polyisocyanate set the basis at 100)
[9]kcal/m.h. ° C. (adiabatic index unit)
[10]stable time (The time when the nucleating agent begins to separate from the polyol and sinks downwards)
[11]Emulsifying method (the method of mixing the nucleating agent and a premix, which comprises the foam stabilizer, the catalyst, the water, the polyol, and the like)

The term "OH value" is used herein to indicate the hydroxyl value, and its unit is mg KOH/g, that is, it is the amount of KOH, measured by mg, consumed in neutralizing acetic acid which is obtained by acetylating and hydrolyzing 1 g of polyol. A Perfluorinated Alkene (PFA) is a mixture having perfluorinated hexene as a main component.

The premix was prepared by mixing overall components except the polyisocyanate and the blowing agent. The emulsified nucleating agent was prepared with 30% of premix; then, the emulsified nucleating agent was mixed with the remaining premix. Then, the blowing agent was added to the premix having the emulsified nucleating agent to make the polyol mixture. Rigid polyurethane foam was prepared by reacting the polyol mixture and the polyisocyanate.

Examples 1 and 2 show a long stable time, that is, 6 days and 7 days, which indicate that the nucleating agent exists stably in the polyol mixture. Further, they show a relatively small closed cell size of 100-150 μm, and thus have an effective adiabatic index of 0.0143 or 0.0144 kcal/m.h.° C.

Comparative example 1 did not emulsify the nucleating agent, though it has the same composition as Examples 1 and 2. Comparative example 1 shows a very short stable time, that is, 0.25 days, which indicates that the nucleating agent exists unstably in the polyol mixture. Thus, comparative example 1 has a relatively large size closed cell and an ineffective adiabatic index.

Comparative examples 2 and 3 have different polyol compositions from the compositions of the Examples, that is, the amount of the toluenediamine-based polyol in the total polyol is as small as 10 parts by weight. As to stable time, comparative examples 2 and 3 are superior to Comparative example 1, but are inferior to the Examples. In addition, the size of the closed cells and the adiabatic index of comparative examples 2 and 3 are inferior to the size of the closed cells and the adiabatic index of the Examples.

Comparative examples 4 and 5 have not only a small amount of the toluenediamine-based polyol, but also a small amount of the nucleating agent of 0.3 parts by weight. Their properties are positioned between Comparative example 1, wherein the nucleating agent is not emulsified, and Comparative examples 2 and 3, wherein the amount of the toluenediamine-based polyol is relatively small. However, the stable times of comparative examples 4 and 5 are longer than the stable times of Comparative examples 2 and 3 due to the relatively small amount of the nucleating agent.

Further, an emulsifying method using a homomixer has advantages over an emulsifying method using a static mixer.

As recited above, emulsifying the nucleating agent stabilizes the nucleating agent in the polyol mixture and improves the properties of the rigid polyurethane foam. Further, the amount of polyaromatic polyol in the polyol mixture and the amount of the nucleating agent play important roles in the stabilization of the nucleating agent and the improvement of the rigid polyurethane foam's properties.

According to an embodiment of the present invention, by using a stabilized nucleating agent, the rigid polyurethane foam having an isolated cell of relatively small size and excellent heat insulating properties is obtainable. This invention is particularly useful when the blowing agent is a hydrocarbon.

Thus, as shown in the flow chart in FIG. 1, operations in accordance with an embodiment of the method of the present invention to produce a rigid polyurethane foam may comprise: emulsifying a nucleating agent by mixing the nucleating agent with a polyol and a foam stabilizer 102; preparing a polyol mixture by mixing water, a catalyst, and a blowing agent at one of the following times: before the emulsifying, during the emulsifying and after the emulsifying 104; and reacting the polyol mixture with a polyisocyanate 106. Where desired, the preparing the polyol mixture may further comprise: mixing at least one of an additional polyol and an additional foam stabilizer at one of: before the emulsifying, during the emulsifying, and after the emulsifying 108.

Figure 2:
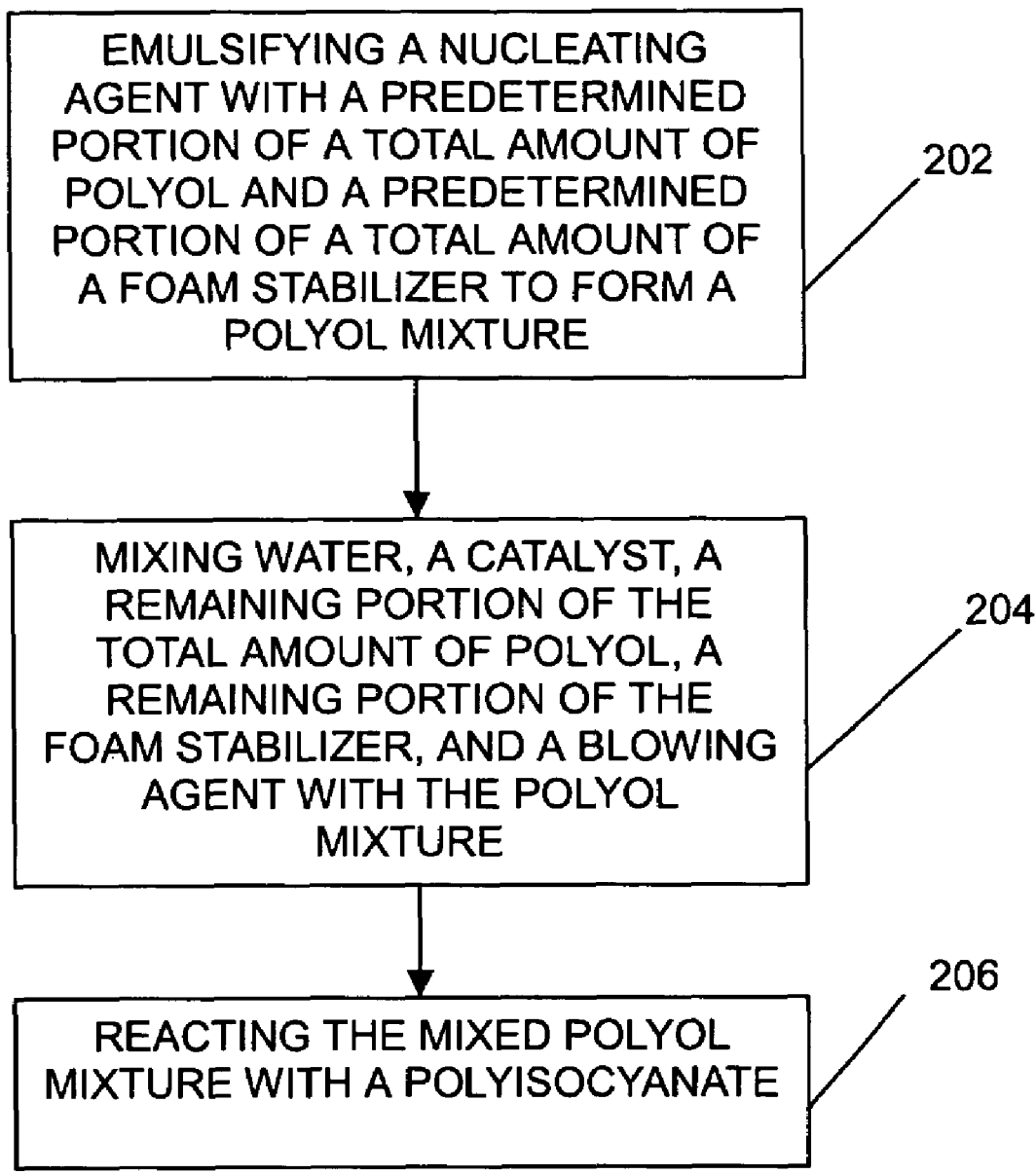
FIG. 2 is a flow chart showing operations in accordance with another embodiment of the method of the present invention.

FIG. 2 is a flow chart showing operations in accordance with another embodiment of the method of the present invention. In this embodiment, the method to produce a rigid polyurethane foam comprises: emulsifying a nucleating agent with a predetermined portion of a total amount of polyol and a predetermined portion of a total amount of a foam stabilizer to form a polyol mixture 202; mixing water, a catalyst, a remaining portion of the total amount of polyol, a remaining portion of the foam stabilizer, and a blowing agent with the polyol mixture 204; and, reacting the mixed polyol mixture with a polyisocyanate 206. The predetermined portion of the total amount of polyol is typically 10-30 parts by weight of the total amount of polyol. The nucleating agent may comprise a perfluorinated alkene containing at least 6 carbons and may have a boiling point of 20-80° C. The amount of the nucleating agent is typically 0.5-5 parts by weight per 100 parts by weight of the total amount of polyol. The total amount of polyol typically comprises a polyaromatic polyol that is 15-70 parts by weight per 100 parts by weight of the total polyol, and the polyaromatic polyol may, for example, comprise a toluenediamine-based polyol. The blowing agent may, for example, be a hydrocarbon such as a cyclopentane. Emulsifying the nucleating agent is generally performed by a homomixer at approximately 1000-6000 rpm.

In the method recited above, the polyaromatic polyol may be selected to comprise a toluenediamine-based polyol, also referred to as a toluenediamine polyol.

In one embodiment, the method of the present invention used to produce a rigid polyurethane foam, comprises: emulsifying a nucleating agent with a predetermined portion of a total amount of polyol and a predetermined portion of a total amount of a foam stabilizer to form a polyol mixture; mixing water, a catalyst, a remaining portion of the total amount of polyol, a remaining portion of the foam stabilizer, and a blowing agent with the polyol mixture; and reacting the mixed polyol mixture with a polyisocyanate. The predetermined portion of the total amount of polyol may be 10-30 parts by weight of the total amount of polyol.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method to produce a rigid polyurethane foam, comprising:
   emulsifying a nucleating agent which is in a liquid phase with 10-30 parts by weight of a total amount of polyol and a portion of a total amount of a foam stabilizer to form a polyol mixture, and initiating a plurality of nuclei of microbubbles to decrease a size of a closed cell;
   mixing water, a catalyst, a remaining portion of the total amount of polyol, a remaining portion of the foam stabilizer, and a blowing agent which is cyclopentane with the polyol mixture; and
   reacting the mixed polyol mixture with a polyisocyanate, to provide a rigid polyurethane foam with the closed cell size in a range of 100 through 150 μm.

2. The method as recited in claim 1, wherein the nucleating agent comprises a perfluorinated alkene containing at least 6 carbons.

3. The method as recited in claim 1, wherein the nucleating agent has a boiling point of 20-80° C.

4. The method as recited in claim 1, wherein the amount of the nucleating agent is 0.5-5 parts by weight per 100 parts by weight of the total amount of polyol.

5. The method as recited in claim 1, wherein the total amount of polyol comprises a polyaromatic polyol that is 15-70 parts by weight per 100 parts by weight of the total polyol.

6. The method as recited in claim 5, wherein the polyaromatic polyol comprises a toluenediamine-based polyol.

7. The method as recited in claim 1, wherein the emulsifying the nucleating agent is performed by a homomixer at approximately 1000-6000 rpm.

* * * * *